US010002457B2

(12) United States Patent
Day et al.

(10) Patent No.: US 10,002,457 B2
(45) Date of Patent: Jun. 19, 2018

(54) IMAGE RENDERING APPARATUS AND METHOD

(71) Applicant: Toshiba Medical Systems Corporation, Otawara-si (JP)

(72) Inventors: Timothy Day, Edinburgh (GB); Morvyn Myles, Edinburgh (GB); Steven Reynolds, Edinburgh (GB); James Hancox, Edinburgh (GB)

(73) Assignee: Toshiba Medical Systems Corporation, Otawara-shi (JP)

( * ) Notice: Subject to any disclaimer, the term of this patent is extended or adjusted under 35 U.S.C. 154(b) by 269 days.

(21) Appl. No.: 14/321,493

(22) Filed: Jul. 1, 2014

(65) Prior Publication Data

US 2016/0005218 A1    Jan. 7, 2016

(51) Int. Cl.
*G06T 15/50* (2011.01)
*G06T 15/08* (2011.01)

(52) U.S. Cl.
CPC .......... *G06T 15/08* (2013.01); *G06T 2210/41* (2013.01)

(58) Field of Classification Search
None
See application file for complete search history.

(56) References Cited

U.S. PATENT DOCUMENTS

2007/0299639 A1    12/2007  Weese et al.
2008/0024515 A1*   1/2008  Yang ....................... G06T 15/06
                                                          345/592

(Continued)

FOREIGN PATENT DOCUMENTS

JP    2006-126        1/2006
JP    2008-511365     4/2008

OTHER PUBLICATIONS

Robert A. Drebin, et al., "Volume Rendering", Computer Graphics, vol. 22, No. 4, Aug. 1988, pp. 65-74.

(Continued)

*Primary Examiner* — Peter Hoang
(74) *Attorney, Agent, or Firm* — Oblon, McClelland, Maier & Neustadt, L.L.P.

(57) ABSTRACT

An image rendering apparatus comprises an image data unit for obtaining volumetric image data representative of a three-dimensional region, a rendering unit configured to perform a rendering process on the volumetric image data that includes a sampling process that comprises, for each of a plurality of sampling paths, determining a respective color or grayscale value for a corresponding pixel based on a plurality of sampled points along the sampling path. For each sampling path, the sampling process performed by the rendering unit comprises for each of at least some of the sampled points, calculating a significance factor for the sampled point based on accumulated opacity along the sampling path for the sampled point, selecting for the sampled point one of a plurality of rendering calculation processes in dependence on the calculated significance factor, and performing the selected rendering calculation process to obtain at least one image data value for the sampled point. For each sampling path the rendering unit is configured to determine the color or grayscale value for the corresponding pixel based on the determined image data values for the plurality of sampled points for the path.

24 Claims, 7 Drawing Sheets

(56) References Cited

U.S. PATENT DOCUMENTS

2008/0232694 A1* 9/2008 Sulatycke ............... G06T 15/08
 382/224
2011/0170756 A1* 7/2011 Schneider ............... G06T 15/08
 382/131
2013/0314417 A1 11/2013 Buyanovskiy

OTHER PUBLICATIONS

John Pawasauskas, "Volume Visualization With Ray Casting", CS563—Advanced Topics in Computer Graphics, http://web.cs.wpi.edu/~matt/courses/cs563/talks/powwie/p1/ray-cast.htm, Feb. 18, 1997, 13 pages.

Byeonghun Lee, "Pre-Integration", Computer Graphics and Image Processing, Apr. 27, 2011, 34 pages.

Klaus Engel, et al., "Segmented Volume Data", Real Time Volume Graphics, AK Peters/CRC Press, Chapter 16, 2006, pp. 415-439.

Klaus Engel, "Real-Time Volume Graphics [08] Improving Performance", Eurographics, 2006, 26 pages.

Klaus Engel, "Real-Time Volume Graphics [09] Improving Quality", Eurographics, 2006, 57 pages.

Markus Hadwiger, et al., "High-Quality Two-Level Volume Rendering of Segmented Data Sets on Consumer Graphics Hardware", VIS Proceedings of the 14$^{th}$ IEEE Visualization, 2003, 8 pages.

Bui Tuong Phong, "Illumination for Computer Generated Pictures", Graphics and Image Processing, Communications of the ACM, vol. 18, No. 6, Jun. 1975, pp. 311-317.

\* cited by examiner

IMAGE RENDERING APPARATUS AND METHOD

FIELD

Embodiments described herein relate to an apparatus for, and method of, rendering volumetric image data, for example volumetric medical image data.

BACKGROUND

Modern three-dimensional imaging techniques including computed tomography (CT) and magnetic resonance imaging (MRI) have the ability to produce volumetric representations of anatomy.

Such three-dimensional techniques produce large three-dimensional volume data sets comprising a three-dimensional array of voxels each representing a property of a corresponding measurement volume. The voxel data may be representative of a scalar field of the scanner. For example, in CT each voxel may represent the attenuation of X-ray radiation by a respective, corresponding measurement volume. The attenuation at the voxel may be represented by an intensity value in Hounsfield units (HU), which is associated with the proton density at the measurement volume.

Shaded volume rendering (SVR) is used in many medical visualization products. SVR is a method of rendering an image for display from volumetric image data.

A three-dimensional volume data set may be rendered using SVR to obtain a two-dimensional image data set that is representative of an image for display, for example for display on a display screen. The two-dimensional image data set comprises an array of pixel values, for example pixel color values.

In SVR, the value for each pixel is usually determined by casting a ray from viewing position or other ray path source into the volume of the volumetric data set. The ray follows a straight path through the data set, sampling the intensity data at points located at regular steps along the ray, and determining at least one image data value for each sampled point using a transfer function which relates intensity to image data values.

The image data values for each sampled point that is determined using the transfer function usually include color and alpha channels (C and α). Alpha represents opacity on a scale where 0 is transparent and 1 is opaque. Each sampled point i is associated with a color $C_i$ and an opacity $\alpha_i$. The opacity may be representative of how solid the material may be at that sample. The opacity may represent the extent to which light is prevented from passing through the sample, regardless of the mechanism by which the light is prevented from passing.

For example, for CT, high intensity values (for example, 1000 HU) may be expected to come from bone, and therefore may be colored white using the transfer function. Lower intensity values may be expected to be representative of organs, for example the liver, and may therefore be colored red. Intensity values that may be associated with tissue may be assigned a lower opacity than intensity values that may be associated with bone. It is known to use transfer functions that provide different variations of opacity values and colors with intensity depending on the material or portion of anatomy that is of most interest. For example in some cases, bone is made transparent or almost transparent (e.g. low opacity value) in the render by use of a suitable transfer function if the anatomical features of interest are likely to be located behind bone.

The ray accumulates a final pixel color according to the following summation of color and opacity values over all sampled points on the ray:

$$C_{final} = \Sigma_{i=1}^{N} C_i \alpha_i \Pi_{j=0}^{i-1}(1-\alpha_j) \quad \text{(Equation 1)}$$

where $C_{final}$ is the final pixel color, N is the number of sampled points on the ray, $C_i$ is the pixel color at sample i (determined via the transfer function) and $\alpha_i$ is the opacity at sample i (determined via the transfer function).

It is known to perform complex rendering calculations for each sampled point with the aim of improving image quality. Such complex calculations may include, for example, pre-integration, lighting techniques or segmentation interpolation.

Each of these complex calculations has a performance cost. For example, the use of each complex calculation may slow down the SVR rendering and/or require additional memory when compared to performing the rendering without the use of the complex calculation.

FIG. 1 illustrates part of a rendering method using complex calculations, which in this case are complex shading calculations. The process of FIG. 1 is performed for each sampled point along a ray. At stage 2, the intensity for the sampled point is determined by looking up the volume (determining the intensity at the appropriate point using the volumetric image data). At stage 4, a sample color and opacity for the sample is determined using the transfer function. At stage 6, complex shading calculations are performed on the sampled point. The complex shading calculations may result in an updated color value for the sampled point. The updated color value may be referred to as an image data value. The updated color values are used in the determination of the final pixel color from the ray, by integrating over the updated color and opacity values for all sampled points on the ray using Equation 1.

Using complex shading calculations may provide better image quality than is obtained from a rendering in which no complex shading calculations are used. Other complex per-sample calculations may also improve image quality.

It is known in some rendering processes to provide early ray termination, in which if the accumulated opacity reaches a threshold at a particular sampled point then no further rendering calculations are performed for points beyond the sampled point, regardless of intensity values or image data values such as opacity or color values for points beyond the sampled point. It is also known in some rendering processes to vary sample point spacings in dependence on opacity values.

It is known in some rendering processes to perform a thresholding process such that no rendering calculation is performed for sampled points that have an intensity value beyond a certain threshold or within a certain range. For example, it is known to perform no rendering calculation for sampled points that are in a region or air or vacuum such that those points are effectively ignored in the render.

BRIEF DESCRIPTION OF THE DRAWINGS

Embodiments are now described, by way of non-limiting example, and are illustrated in the following figures, in which.

DETAILED DESCRIPTION

Certain embodiments provide an image rendering apparatus comprising an image data unit for obtaining volumetric image data representative of a three-dimensional region, a rendering unit configured to perform a rendering process on the volumetric image data that includes a sampling process that comprises, for each of a plurality of sampling paths, determining a respective color or grayscale value for a corresponding pixel based on a plurality of sampled points along the sampling path. For each sampling path, the sampling process performed by the rendering unit comprises for each of at least some of the sampled points:—calculating a significance factor for the sampled point based on at least accumulated opacity along the sampling path for the sampled point, selecting for the sampled point one of a plurality of rendering calculation processes in dependence on the calculated significance factor, and performing the selected rendering calculation process to obtain at least one image data value for the sampled point. For each sampling path the rendering unit is configured to determine the color or grayscale value for the corresponding pixel based on the determined image data values for the plurality of sampled points for the path.

Certain embodiments provide a method of rendering comprising obtaining volumetric image data representative of a three-dimensional region, performing a rendering process on the volumetric image data that includes a sampling process that comprises, for each of a plurality of sampling paths, determining a respective color or grayscale value for a corresponding pixel based on a plurality of sampled points along the sampling path. For each sampling path, the sampling process performed by the rendering unit comprises for each of at least some of the sampled points:—calculating a significance factor for the sampled point based on at least accumulated opacity along the sampling path for the sampled point, selecting for the sampled point one of a plurality of rendering calculation processes in dependence on the calculated significance factor, and performing the selected rendering calculation process to obtain at least one image data value for the sampled point. The method comprises for each sampling path determining the color or grayscale value for the corresponding pixel based on the determined image data values for the plurality of sampled points for the path. The method further comprises displaying a rendered image using the determined pixel color or grayscale values.

Figure 2:
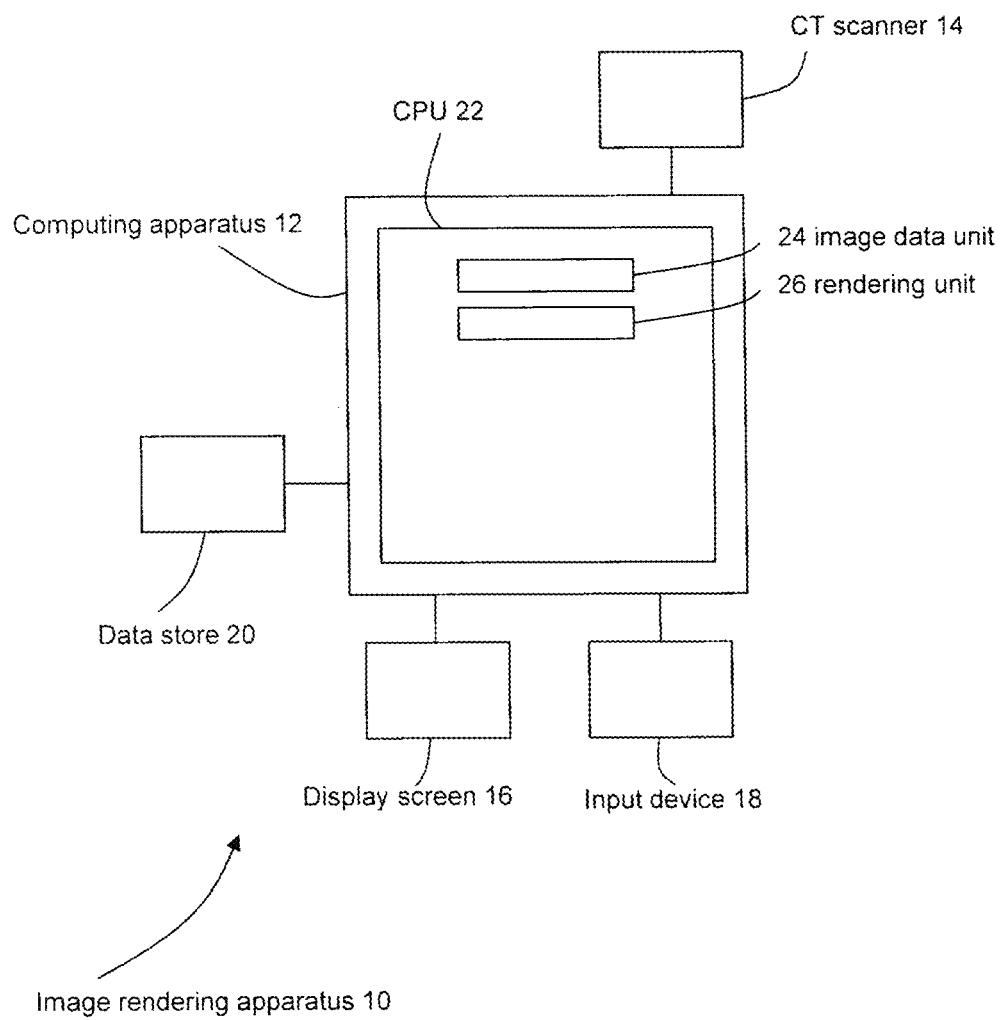
FIG. 2 is a schematic diagram of an image rendering apparatus according to an embodiment.

An image rendering apparatus 10 according to an embodiment is illustrated schematically in FIG. 2. The image rendering apparatus 10 comprises a computing apparatus 12, in this case a personal computer (PC) or workstation, that is connected to a CT scanner 14, a display screen 16 and an input device or devices 18, such as a computer keyboard and mouse. In the present embodiment, sets of image data are obtained by the CT scanner 14 and stored in data store 20. In other embodiments, sets of image data may be loaded from a remote data store or other memory.

Computing apparatus 12 comprises a central processing unit (CPU) 22 that is operable to load and execute a variety of software modules or other software components that are configured to perform the method that is described below with reference to FIG. 3 and FIG. 4.

The computing apparatus 12 includes an image data unit 24 for obtaining volumetric image data and a rendering unit 26 for rendering the volumetric image data to produce a two-dimensional image data set for display.

In the present embodiment, the image data unit 24 and rendering unit 26 are each implemented in computing apparatus 12 by means of a computer program having computer-readable instructions that are executable to perform the method of the embodiment. However, in other embodiments, the various units may be implemented as one or more ASICs (application specific integrated circuits) or FPGAs (field programmable gate arrays).

The computing apparatus 12 also includes a hard drive and other components of a PC including RAM, ROM, a data bus, an operating system including various device drivers, and hardware devices including a graphics card. Such components are not shown in FIG. 2 for clarity.

Figure 3:
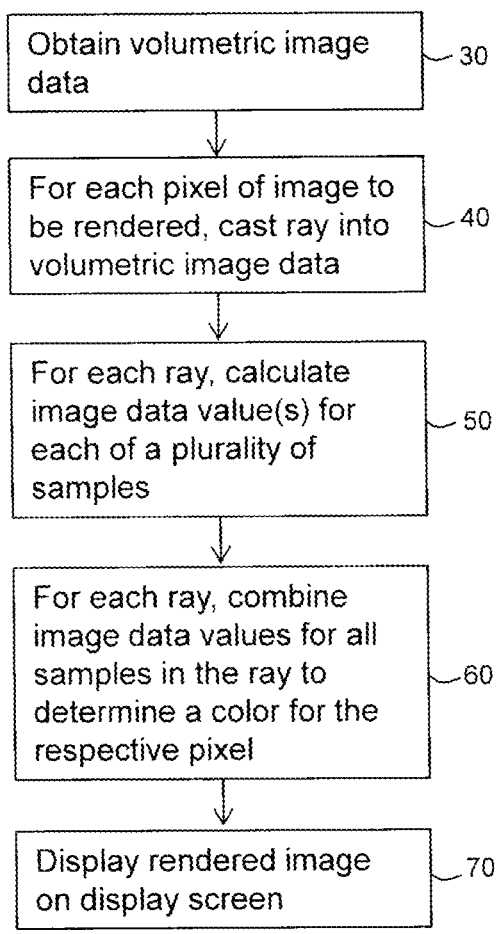
FIG. 3 is a flow chart illustrating in overview an image rendering process according to an embodiment.

The apparatus of FIG. 2 is configured to perform a series of stages as illustrated in overview in the flow chart of FIG. 3.

At stage 30, the image data unit 24 obtains a volumetric image data set from data store 20. In other embodiments, the image data unit 24 may obtain the volumetric image data set directly from scanner 14, from a remote data store, or from any other suitable location. The volumetric data set is representative of a three-dimensional region of a patient or other subject.

At stages 40 to 60, the rendering unit 26 performs a rendering process on the volumetric image data set to obtain a two-dimensional rendered image data set representative of an image for display, the two-dimensional rendered image data set comprising a plurality of pixels.

At stage 40 the rendering unit 26 casts a plurality of rays into the volumetric image data set, one ray for each of the plurality of pixels. Each ray in this case follows a straight path through the data set. Each ray may be described as a sampling path.

At stage 50, for each ray, the rendering unit 26 performs a sampling process. The rendering unit 26 samples the volumetric image data set at each of a plurality of points along the ray. In the present embodiment, the sampled points are spaced along the ray at regular intervals. The sample spacing in this case is independent of properties at the sampled points, for example intensity or opacity, and is constant throughout the volume.

The rendering unit 26 calculates at least one image data value for each sampled point. For each sampled point, the calculation of the image data value at stage 50 comprises stages 51 to 56 as detailed in the flowchart of FIG. 4. The process of FIG. 4 is repeated for every sampled point on every ray. In other embodiments, a subset of rays may be considered. In some embodiments, for some or all rays, a subset of the sampled points may be considered.

Figure 4:
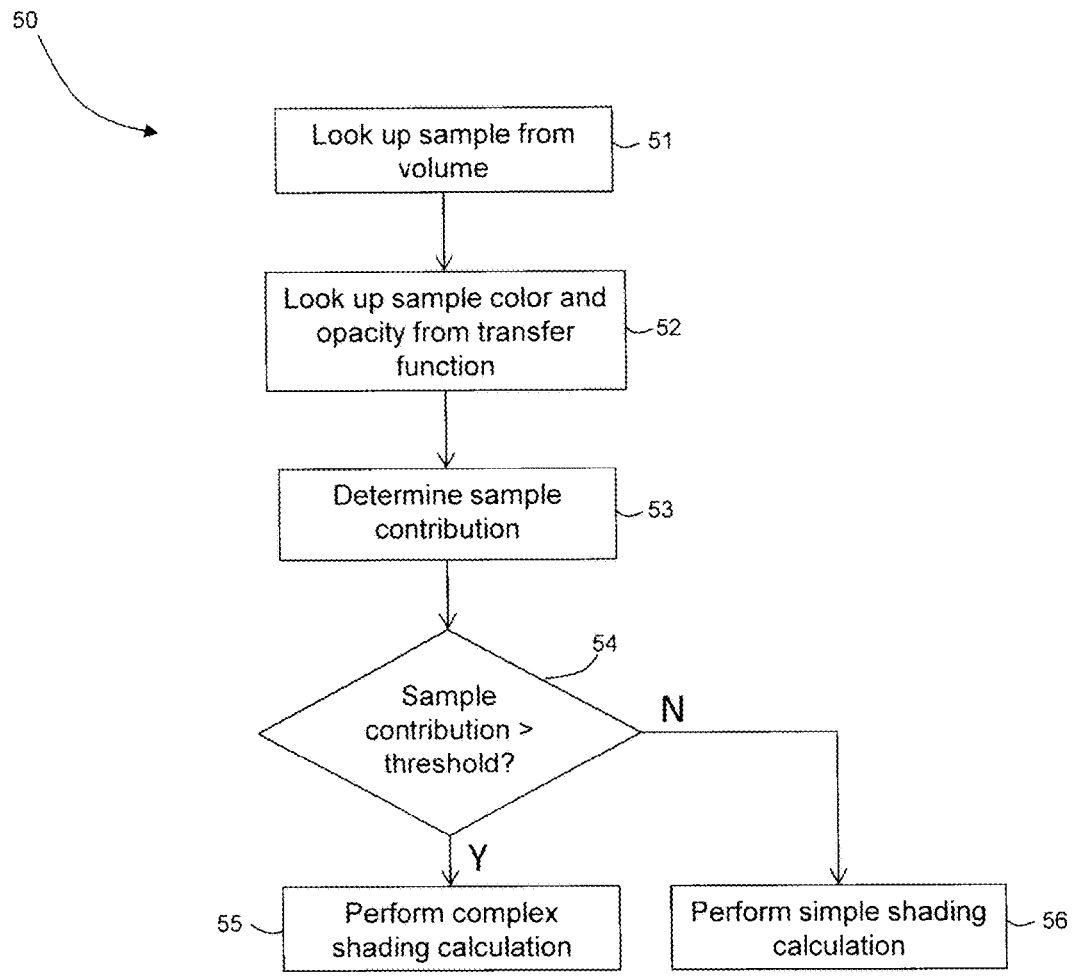
FIG. 4 is a flow chart illustrating in overview a method of calculating image data values for a sampled point, according to an embodiment.

At stage 51 of FIG. 4, the rendering unit 26 looks up an intensity value for the sampled point from the volumetric image data. The rendering unit 26 looks up the intensity value at the sampled point by interpolating intensity values from the voxels that are nearest to the sampled point to obtain an intensity value at the sampled point.

At stage 52, the rendering unit 26 looks up a color and opacity for the sampled point by using a transfer function to relate the intensity at the sampled point to color and opacity. Different intensities may be related to different colors, for example white for high intensity (representative of bone) and red for lower intensities (representative of tissue). Different intensities may be related to different opacities. For example, higher intensities may be associated with higher opacity.

In alternative embodiments, the rendering unit 26 determines a color and/or opacity for each voxel using the transfer function, and determines a color and/or opacity for each sampled point using the determined colors and/or opacities for its neighboring voxels. The rendering unit 26 may obtain converted volumetric image data by converting the intensity values to color values and opacity values for positions in the volume and determining color values and opacity values for sampled points may comprise determining color and opacity using the converted volumetric image data.

Although in the present embodiment color and opacity are determined using a transfer function that relates intensity to both color and opacity, in other embodiments different methods of determining color and opacity may be used. Color and opacity may be related to intensity by using, for example, a list or look-up table or a procedural function. References to color below may be replaced by references to grayscale if the rendered image is to be a grayscale image rather than a color image.

In some embodiments, a classifier function may be used in assigning color and opacity to sampled points. For example, a classifier function may be used to assign a material to each voxel (for example, bone, liver, air) based on any appropriate classification criteria. A classification of the sampled point as a particular material may be determined using the classification of voxels neighboring the sampled point. Color and opacity may then be determined for the sampled point based on the determined material.

In some embodiments, the volumetric data set may be segmented before the determination of color and opacity for each sampled point. Each sampled point may be assigned to an appropriate structure (for example, a bone, a vessel or an organ) in dependence on the segmentation. The color and opacity for the sampled point may be determined based on the structure to which the sampled point is assigned.

At stage 53, the rendering unit 26 determines a significance factor for the sampled point. The significance factor is representative of the extent to which the sampled point is likely to contribute to the final pixel color determined for the ray that the sampled point is on.

Not all sampled points contribute equally to the final image. Some sampled points are obscured by other sampled points that are in front of them, and so have little impact on the final pixel color. Some sampled points have low opacity, and so have little impact on the final pixel color. Sampled points that have high opacity and/or are near the start of the ray may contribute more to the final pixel color than sampled points that have lower opacity and/or are near the end of the ray.

Sample contribution is a significance factor that expresses how significant is the contribution of a given sampled point to the final pixel color of the ray.

Sample contribution may be expressed in some embodiments as:

$$\text{Sample Contribution} = \alpha(1 - \text{accumulated }\alpha) \quad \text{(Equation 2)}$$

where $\alpha$ is the opacity at the sampled point which has been looked up using the transfer function at stage 52 and accumulated $\alpha$ is a cumulative opacity due to all the previous sampled points along the ray. For example, the sample contribution for the $4^{th}$ sampled point along the ray is the opacity at that sampled point multiplied by one minus the accumulated opacity from the $1^{st}$ to $3^{rd}$ sampled points along the ray.

The accumulated opacity over the first n sampled points in the ray is calculated as $$\text{accumulated }\alpha = \Sigma_{i=1}^{n}\alpha_i\Pi_{j=0}^{i-1}(1-\alpha_j) \quad \text{(Equation 3)}$$

For example, the accumulated opacity over the $1^{st}$ to $3^{rd}$ sampled points along the ray is:—

$$\text{accumulated }\alpha = \alpha_1 + \alpha_2(1-\alpha_1) + \alpha_3(1-\alpha_2)(1-\alpha_1) \quad \text{(Equation 4)}$$

Therefore the sample contribution for the (n+1)th sample is $$\alpha_{n+1}(1 - \Sigma_{i=1}^{n}\alpha_i\Pi_{j=0}^{i-1}(1-\alpha_j)) \quad \text{(Equation 5)}$$

by substituting Equation 3 into Equation 2, the accumulated opacity in Equation 2 being the opacity that has been accumulated over all the previous sampled points.

For example, the sample contribution for the $4^{th}$ sampled point is:

$$\begin{aligned}\text{Sample Contribution} &= \alpha_4(1 - \text{accumulated }\alpha) \quad \text{(Equation 6)}\\ &= \alpha_4(1 - \alpha_1 - \alpha_2(1-\alpha_1) - \\ &\quad \alpha_3(1-\alpha_2)(1-\alpha_1)).\end{aligned}$$

Although a particular significance factor (sample contribution) is given in Equation 2, in alternative embodiments any significance factor may be used which represents the significance of the sampled point to the final pixel color. The significance factor may be defined in terms of opacity and accumulated opacity. The accumulated opacity may comprise a combination of the opacities of all sampled points before the sampled point (excluding the sampled point), a combination of the opacities of all sampled points before the sampled point plus the opacity of the sampled point itself, or a combination of the opacities of some of the sampled points before or including the sampled point. For example, the accumulated opacity may represent a combination of opacities from a subset of the previous sampled points, a down-sampled set of the previous sampled points, the most significant previous sampled points, a set of sampled points within a segmented structure, or any other suitable set of previous sampled points.

In some embodiments a significance factor may be calculated based directly on the intensity at the sampled point and the intensities of previous sampled points on the ray, without first determining opacity using a transfer function.

Returning to Equation 2, it may be seen that the value for the sample contribution at a sampled point may be high if either or both of the following conditions apply:
a) the opacity $\alpha$ of the sampled point is high
b) the value of accumulated opacity at the sampled point is low.

The value of the accumulated opacity at a given sampled point may be low if there are few samples before the given sampled point that have had high opacity values. For example, the given sampled point may be one of the first sampled points in the ray, or the previous sampled points on the ray may have been mostly transparent.

Similarly, the value for the sample contribution may be low if either or both of the following conditions apply:
a) the opacity $\alpha$ of the sampled point is low (the sampled point is entirely or somewhat transparent or translucent)
b) the value of accumulated opacity at the sampled point is high.

The value of accumulated opacity at the sampled point may be more likely to be high if there is a large number of previous sampled points on the ray or the previous sampled points on the ray have high opacity.

Sampled points at the start of the ray may have a high sample contribution unless they are highly transparent, since the value for accumulated opacity may be low near the start of the ray. Sampled points further along the ray path may have a low contribution even if they are significantly opaque, if the sampled points before them have a high enough opacity that accumulated $\alpha$ is high.

Figure 5:
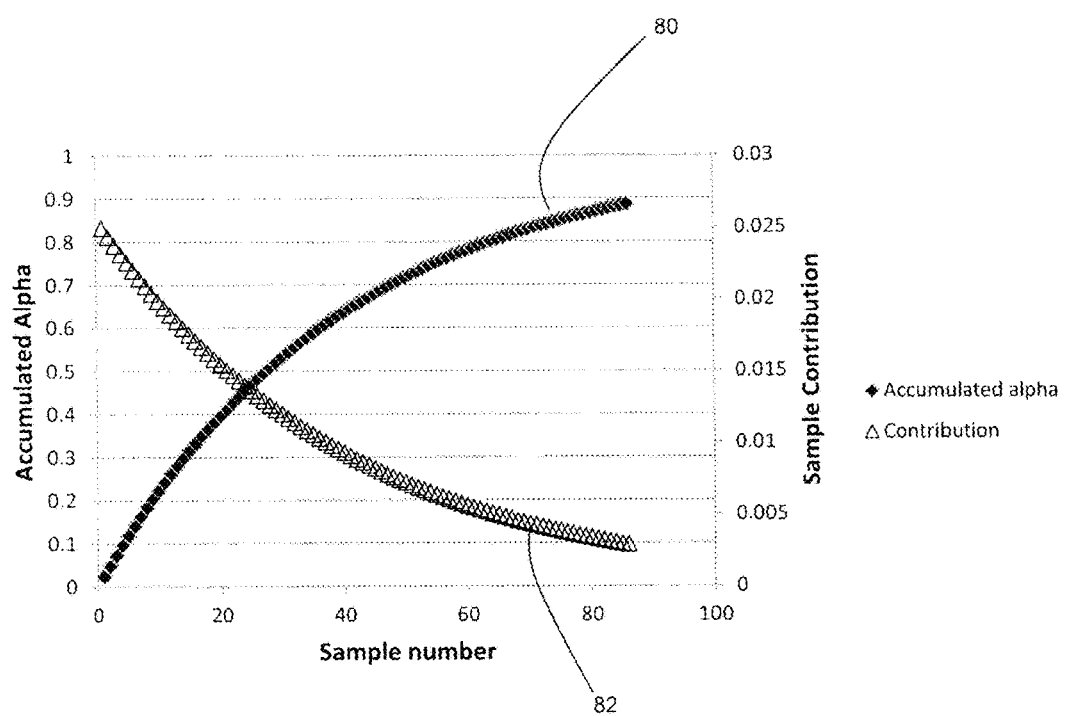
FIG. 5 is a graph illustrating the sample contribution for each of a plurality of sampled points along a ray, all the sampled points having the same opacity.

The effect on sample contribution resulting from the position of a given sampled point along the ray is demonstrated in FIG. 5. FIG. 5 is a plot of accumulated opacity 80 and sample contribution 82 against sample number for the simple case in which every sampled point has the same opacity value, opacity=0.025. The sampled points are placed at equal intervals along the ray and are numbered sequentially with sampled point 1 being the first sampled point on the ray.

The accumulated opacity 80 relating to each sampled point rises with sample number, because each sampled point adds to the accumulated opacity. The contribution 82 of each sampled point falls with sample number even though, in the example of FIG. 5, the sample opacity remains constant. The fall in contribution with sample number is due to the increase in the accumulated opacity.

Figure 6:
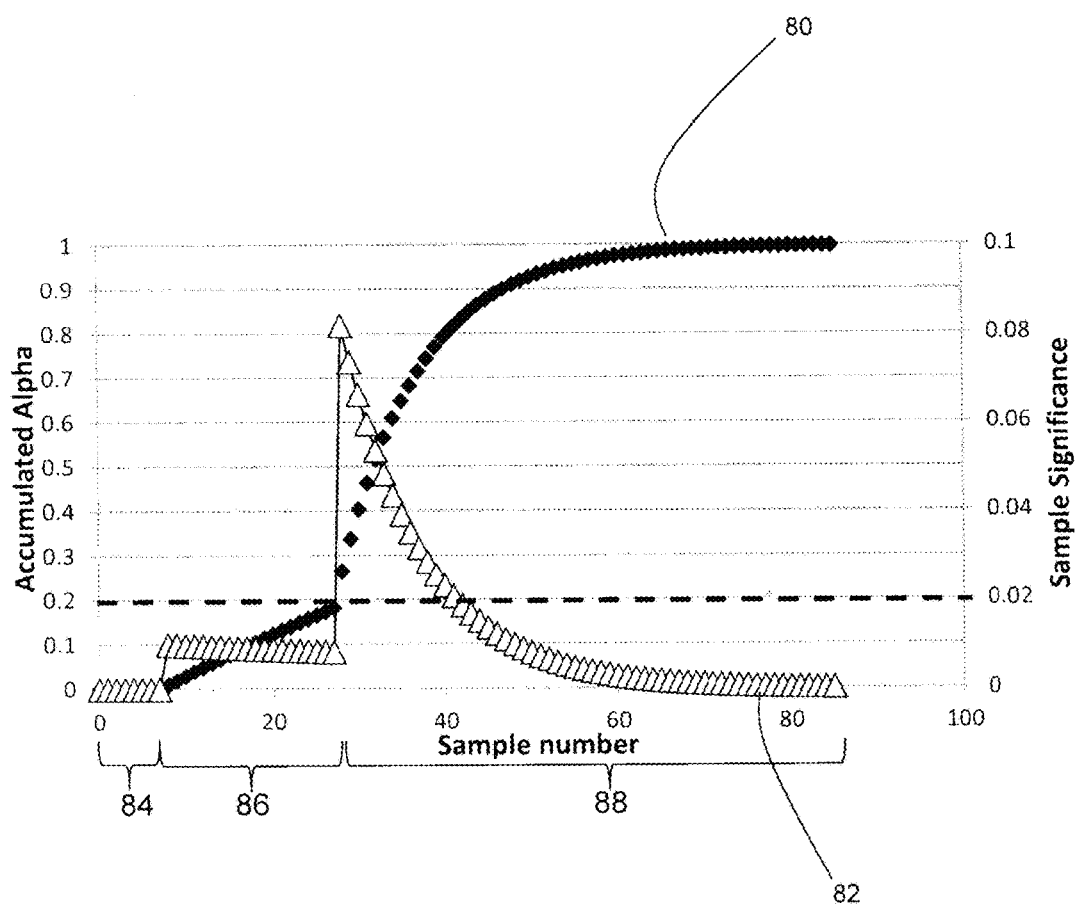
FIG. 6 is a graph illustrating the sample contribution for each of a plurality of sampled points along a ray, the sampled points having different opacity in dependence on the materials that they represent.

FIG. 6 is a plot of accumulated opacity 80 and sample contribution 82 against sample number for a case in which the opacity at the sampled points varies along the ray. The variation of opacity with position along the ray may be similar to the variation of opacity with position along the ray that may be seen in a volumetric image data set that is representative of a medical image. The sample numbers increase from 0, which represents the position of the source of the ray or other sampling path, with increasing sample number representing increasing distance from the source.

Sampled points in a first region 84 have an opacity of 0 (the sampled points are transparent). For each sampled point in region 84, opacity is 0, accumulated opacity is 0, and sample contribution is 0. Region 84 may correspond to a region of a volumetric data set that is representative of empty space (for example, air or vacuum).

Sampled points in a second region 86 have an opacity of 0.01 (1% opacity), which may be representative of tissue. Sampled points in region 86 (beyond the first sample in that region) have a non-zero accumulated opacity. As the ray passes through region 86, the accumulated opacity of each sampled point is slightly greater than the accumulated opacity of the previous sampled point, so the sample contribution of each sampled point is slightly less than the sample contribution of the previous sampled point.

The ray then enters a third region, region 88. Sampled points in region 88 each have an opacity of 10% (0.1), which may be representative of bone. For example, an opacity of 10% may be representative of bone in a rendering mode in which bone is rendered as somewhat transparent (which may be called transparent bone mode).

The transition between region 86 and region 88 (between tissue and bone) causes a large increase in sample contribution initially. The first sampled point in region 88 has a large opacity and relatively small accumulated opacity so its sample contribution is very high. As the ray passes through region 88, the accumulated opacity increases substantially to a high value (very near 1) and the sample contribution of each sampled point decreases, since each sampled point has a high accumulated opacity.

At stage 54, the rendering unit 26 applies a contribution threshold to each of the sampled points. In the present embodiment, the contribution threshold is a contribution value of 0.02. In other embodiments, a different contribution value may be used as a threshold. The rendering unit 26 then compares the sample contribution for the sampled point to the contribution threshold.

For each sampled point, if the contribution value for the sampled point is above or equal to the threshold, the process of FIG. 4 proceeds to stage 55. At stage 55, a first rendering calculation process is performed on the sampled point. The first rendering calculation process comprises a complex shading calculation.

Lighting is calculated for each sampled point in accordance with a lighting model. The lighting calculation may for example comprise a lighting calculation at the point itself, or lighting calculations may for example be performed for neighboring voxels and the results or calculations then interpolated at the sampled point. In some cases a normal at each voxel may be pre-calculated and stored in a lighting volume, and used in subsequent calculations for sampled points. In general, lighting may comprise a combination of ambient, diffuse and specular light (which may be combined in accordance with a lighting equation). The lighting model may comprise Phong shading (Bui Tuong Phong, Illumination for computer generated pictures, Communications of ACM 18 (1975), no. 6, 311-317).

In the present embodiment, specular light is included in the lighting model. In other embodiments, specular light may not be included. Diffuse and specular lighting may be referred to as directional lighting.

Ambient light is common to the entire image and provides a constant lighting contribution. An ambient light level may be chosen by a user. An ambient light level may be provided by default by the rendering unit 26.

Diffuse light varies with surface orientation. Therefore, in order to calculate the diffuse light for the sampled point, the rendering unit 26 calculates a normal at the sampled point. The normal, for example a normal vector, may be calculated in dependence on the intensity values in the local area of the sampled point. Calculation of the normal vector may comprise calculating an intensity gradient.

The rendering unit 26 multiplies the normal vector by a lighting direction to obtain a diffuse lighting contribution. In some embodiments, multiple lighting directions may be considered.

The rendering unit adds the resulting diffuse lighting contribution to the ambient lighting contribution and to a specular lighting contribution to determine an overall lighting contribution for the sampled point. Thus, a lighting calculation is performed that comprises determining a light level for a sampled point based on ambient light level and/or a diffuse light level (for example, a proportion of diffuse light) and/or a specular light level (for example, a proportion of specular light). In other embodiments, the specular lighting contribution may be omitted. The rendering unit 26 outputs at least one image data value that has been obtained from the lighting calculation. In the present embodiments, the image data value that has been obtained from the lighting calculation is an updated color value that takes into account the lighting that has been calculated at stage 55.

If the contribution value for the sampled point is below the threshold, the process of FIG. 4 proceeds to stage 56. At stage 56, a second rendering calculation process is performed on the sampled point. The second rendering calculation process differs from the first rendering calculation process in that it comprises a simplified shading calculation instead of the complex shading calculation described above with reference to stage 55.

In the simplified shading calculation, no normal is calculated at the sampling point. Instead, a fixed proportion of a diffuse light level is used. The fixed proportion of diffuse light is added to the ambient light. In the present embodiment, the proportion of the diffuse light is 0.5 times a diffuse light intensity. In other embodiments, a different proportion may be used. In some embodiments, the proportion may not be a fixed proportion and may be determined using any suitable criteria.

In the present embodiment, no specular contribution is included in the simplified shading calculation. In some embodiments, a proportion of a specular light intensity may also be added to the ambient light and the diffuse light.

A reason for omitting the calculation of the normal and instead using a fixed proportion of diffuse light is that regions of the volume that are mostly transparent tend to comprise substantially homogeneous material. The intensity values for mostly transparent regions may be approximately flat, with some small amount of noise. Therefore, normals for the voxels in mostly transparent regions may point effectively in random directions.

To simplify the calculation at points in a mostly transparent region, a normal is not calculated for voxels in those regions and instead, each voxel is lit with the current ambient light level and a proportion of the diffuse light.

The proportion of the diffuse light used in the simplified shading calculation may be a fixed proportion of the diffuse light. The proportion may be calculated by working out how much light would be reflected towards the camera from a large series of almost-invisible points, each with a randomly facing normal.

For a single directional light, the proportion of the diffuse light may be 0.25 times the diffuse light intensity.

For a bidirectional light, the factor may be 0.5 times the diffuse light intensity.

Omitting the calculation of the normal may be an adequate approximation to lighting in a mostly transparent region, as described above. Furthermore, omitting the calculation of the normal may also be an acceptable simplification when calculating lighting for any sampled point that has been determined to have a low contribution to the final pixel color. An error in the lighting calculation of a low-contribution sampled point on a ray may make only a minimal difference to the final pixel color for the ray.

Referring again to FIG. 6, points in regions 84 and 86 all have a sample contribution below the threshold of 0.02 and so simplified shading may be used at these points, e.g. for a sub-set of the sampled points. The first points in region 88 have a sample contribution above the threshold of 0.02. A complex shading calculation may be used at each of these points, e.g. for another sub-set of the sampled points. When the sample contribution drops below 0.02 again for later points in region 88, simplified shading is once again used, e.g. for a further sub-set of the sampled points.

For the example ray of FIG. 6, 90% of sampled points on the ray fall below the threshold of 0.02. Therefore, a simpler (and faster) lighting calculation may be used for 90% of the sampled points. Faster approximations may be used for sampled points for which the sample contribution is low. A simplified lighting mode can cut in and out repeatedly along the length of a ray.

The output of stage 55 or stage 56 (as appropriate, depending on the route taken at stage 54) of FIG. 4 is at least one image data value for the sampled point that has been determined by either a first rendering calculation process comprising a complex shading calculation or a second rendering calculation process comprising a simple shading calculation, as appropriate.

Image data values may, for example, comprise color values, grayscale values, or opacity values. In the present embodiment, the image data value for the sampled point that is output at stage 55 or 56 comprises an updated color value for the sampled point, which takes into account the shading calculation, and an associated opacity value.

Turning back to FIG. 3 at the completion of stage 50 (stage 50 comprising stages 51 to 56), at stage 60 the rendering unit 26 combines the determined image data values for the sample points of each ray. For each ray, the rendering unit 26 uses Equation 1 to determine a color for the pixel that is associated with the ray. The color values used for the calculation of Equation 1 are the updated color values obtained from stage 55 or 56.

The pixel color values are stored as a two-dimensional image data set representative of an image that is suitable for display on a display screen. At stage 70, the image corresponding to the two-dimensional image data set is displayed on display screen 16.

In the present embodiment, image data values are determined for all the sampled points in the ray. No sampled point is omitted. Some image data values are calculated using a first rendering calculation process comprising a complex shading calculation (stage 55) while other image data values are calculated using a second rendering calculation process comprising a simpler shading calculation (stage 56). Those samples calculated using simpler shading calculation of stage 56 are those that have been determined to make a low contribution to the final color value of the pixel.

The method of FIG. 3 and FIG. 4 may provide a reduction in computational cost when compared with methods in which a complex shading calculation is performed for every sampled point. In the method of FIG. 3 and FIG. 4, a simpler shading calculation is used for some of the pixels, based on the contribution threshold. The simpler shading calculations require less computational power than using a complex shading calculation for the relevant sample points.

Figure 1:
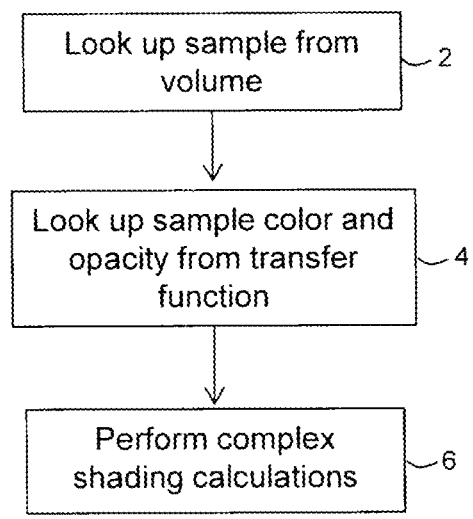
FIG. 1 is a flow chart illustrating in overview a previously-known method of calculating image data values for a sampled point.
Figure 7A:
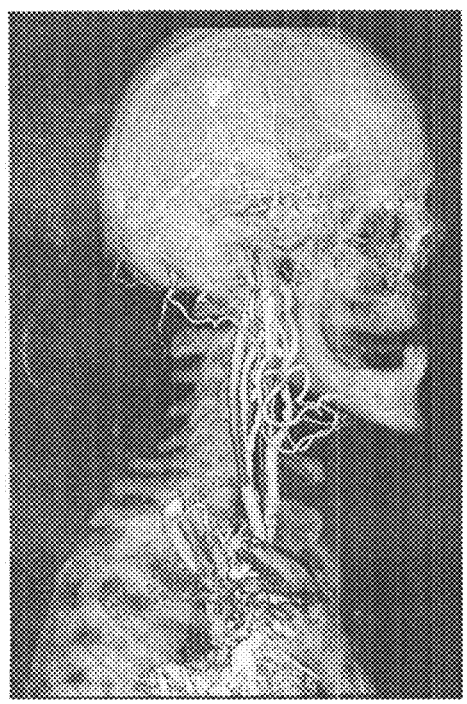
FIG. 7a is an image rendered using a previously-known rendering method.
Figure 7B:
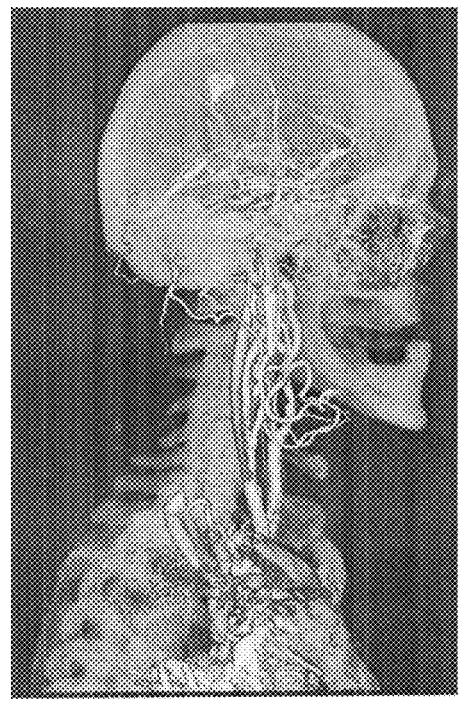
FIG. 7b is an image rendered using the method of an embodiment.

FIGS. 7a and 7b are two images rendered from the same volumetric image data set. FIG. 7a has been rendered using a previously-known method as described above with reference to FIG. 1, in which a complex shading calculation is performed for every sample. In FIG. 7a, the complex shading calculation for each sampled point involves the calculation of a normal at that sampled point.

FIG. 7b has been rendered using the method of FIG. 3 and FIG. 4. Complex shading calculations are performed for those sample points having a sample contribution above a threshold contribution value (in the case of FIG. 7b, the threshold value is 0.02). Simpler shading calculations are performed for samples having a contribution below the threshold contribution value. In the case of FIG. 7b, an image data value is calculated for each sample having a contribution above the threshold using a complex shading calculation which includes calculation of a normal for each sample point. Image data values for samples having a contribution below the threshold are calculated using the simpler shading calculation described above, in which no normal is calculated for the sample point and instead a fixed proportion of the diffuse light is used for those samples.

In a transparent bone rendering mode, sample points inside the bone may have a low contribution due to the high accumulated opacity that results from samples at the bone surface. In the transparent bone case, if the normals were calculated for the samples inside the bone, the normals may not be completely random. However, in FIG. 7b the use of simplified shading calculation inside the bone results in the inside of the bone looking as though random normals were used.

The use of simplified shading (similar to the use of random normals) in FIG. 7b results in a somewhat smoother appearance of regions that are inside bone than is the case in FIG. 7a. However, the smoother appearance of the inside of the bone may be acceptable to clinicians. In some circumstances, the smoother appearance of the inside of the bone may be useful in comparison to the more grainy appearance that may result when normals are calculated. For example, the transparent bone mode may be used in circumstances where the clinician wishes to see the organs behind the bone more clearly, in which case the appearance of the bone itself may not be of high importance to the clinician.

The image of FIG. 7b was rendered (using the method of FIG. 3 and FIG. 4) 40% faster than the image of FIG. 7a (which was rendered using a complex lighting calculation for every sample point).

A two-dimensional rendered image data set may comprise, for example, one million pixels (1000×1000 pixels). A large number of samples may be used to determine the color of each pixel, for example at least hundreds of samples on a single ray. The method of FIG. 3 and FIG. 4 may enable the computational cost of rendering the two-dimensional rendered image data set by reducing the complexity of the calculation associated with some of the samples.

The embodiment described above with reference to FIG. 3 and FIG. 4 involves, for each sampled point, a selection of a first rendering calculation process comprising a complex shading calculation or a second rendering calculation process comprising simpler shading calculation. The first rendering calculation process or second rendering calculation process is selected in dependence on a determined sample contribution for the sampled point.

In other embodiments, the first rendering calculation process may comprise any complex calculation process (where a complex calculation process is a process that is performed for sample contributions above a pre-defined threshold). The second rendering calculation process may comprise a calculation process which includes a simplified version of the complex calculation process (for example an approximation of the complex calculation process) or may omit the complex calculation process.

A complex calculation process may be a process that is more complex than an alternative calculation process, a process that requires more memory than an alternative calculation process, a process that is more time consuming than an alternative calculation process or a process that requires more processing power than an alternative calculation process. A complex calculation process may be any process that goes beyond the simple looking up of color and opacity that was performed at stage 52.

Complex calculation processes may comprise, for example, pre-integration calculations, lighting calculations, shading calculations, segmentation interpolation calculations, object-to-object blending calculations, or irradiance calculations (for example, for global illumination algorithms). Complex calculation processes may comprise shadow rays and/or ambient occlusion sampling rays. The first rendering calculation process may comprise several complex calculation processes. Several complex calculation processes may be performed on any one sampled point.

If the sample contribution is below a predefined threshold, then by choosing the second rendering calculation process, more advanced calculations such as lighting may be disabled and faster, less accurate approximations may be used instead.

Each rendering calculation process may comprise any calculation that may be performed for sampled points, for example for individual sampled points in ray casting.

For each sampled point, the first rendering calculation process of stage 55 may comprise several different types of calculation process. For example, in one embodiment, the first rendering calculation process may comprise a complex shading calculation, a complex irradiance calculation and a pre-integration. The second rendering calculation process (performed for sampled points below the threshold) may comprise a simplified shading calculation and a simplified irradiance calculation, and may omit the calculation of pre-integration.

In one embodiment, the first rendering calculation process comprises object-to-object blending. Object-to-object blending is an interpolation process that makes the edges of segmented objects have a smooth appearance. An example of object-to-object blending is described in M. Hadwiger et al, High Quality Two Level Volume Rendering of Segmented Data Sets, Vis'03, Proceedings of the $14^{th}$ IEEE Visualization Conference, 24 Oct. 2003.

Between stage 30 and stage 40 of FIG. 3, the volumetric image data is segmented using a segmentation algorithm and/or user selection. At stage 52, a color and opacity for each sampled point is determined using different color look-up tables for each of a plurality of segmented structures. A different color is used to represent each structure (for example, each organ, bone or vessel). A sample contribution for each sampled point is calculated as described above with reference to FIG. 4.

At stage 54, the rendering unit 26 determines whether the sample contribution is greater than the threshold. If the sample contribution is greater than the threshold, the rendering unit 26 selects and performs a first rendering calculation process which comprises object-to-object blending at the sampled point at stage 55. If the sample contribution is less than the threshold, the rendering unit 26 selects a second rendering calculation process which does not comprise performing object-to-object blending. In other embodiments, if the sample contribution is less than the threshold, the rendering unit 26 selects and performs a second rendering process comprising a simplified version of object-to-object blending.

In one embodiment, the first rendering calculation process comprises pre-integration. Pre-integration is a technique that involves using colors that are pre-computed for an interval between sampled points, with the results of the computations being stored in a two-dimensional look-up table. Corresponding opacity and color values for each possible pair of intensity values and sampled spacings are pre-computed using the transfer function and stored in the look-up table. For each successive pair of samples along the ray path, the rendering unit 26 looks up the pre-computed color and opacity value from the 2-D look-up table that corresponds to that pair of sampled intensity values and that sample spacing. The pre-integrating effectively provides a slab-by-slab rendering process rather than a slice-by-slice rendering process for each pixel, and thus can provide a smoothing to counteract any volatility in the transfer function and in the data sampled.

In an embodiment in which the first rendering calculation process comprises pre-integration and the second rendering process does not comprise pre-integration, the pre-integration process may be turned on and off in dependence on sample contribution. For example, when considering a pair of sampled points, pre-integration may only be performed for that pair of sampled points if both of the sampled points have a sample contribution greater than the threshold value. In another embodiment, pre-integration may only be performed if one or both of the sampled points have a sample contribution greater than the threshold value. If neither of the sampled points has a sample contribution greater than the threshold value, pre-integration may be disabled.

In a further embodiment, the first rendering calculation process comprises a global illumination lighting process. In the global illumination process, light rays are cast into the volumetric image data set to determine a light volume comprising an array of irradiance values. Rays are then cast into the light volume from a viewing direction to determine the final image.

In the global illumination embodiment, an opacity value and color value for each sampled point in the light volume are determined based on the intensity values and the irradiance values of the light volume. The method of FIG. 3 and FIG. 4 is used to determine whether or not complex irradiance calculations are performed on the sampled points in the light volume.

In another embodiment, the first rendering calculation comprises an ambient occlusion calculation, for example an ambient occlusion calculation as described in Hernell, F, Ljung, P and Ynnerman, A, Local Ambient Occlusion in Direct Volume Rendering, Visualization and Computer Graphics, IEEE Transactions on, Vol 16, Issue, 4, July-August 2010. The second rendering calculation omits the ambient occlusion calculation.

The method of FIG. 3 and FIG. 4 enables complex calculations to be turned on and off along the length of the ray, as shown in the example of FIG. 6. The method described with reference to FIG. 3 and FIG. 4 does not cease all calculations on reduced visibility. The simplified calculations (for example, simplified lighting) can switch on and off multiple times along a single ray.

The method of FIG. 3 and FIG. 4 uses sampled points having a regular constant spacing along each ray, whilst also reducing computational complexity of the rendering calculations for some of the sampling points. Maintaining a fixed step size may benefit other calculations or processes, for example the calculation and usage of a pre-integrated table. If the step size were to be variable then the pre-integrated table would in some cases require another axis to account for step size changes, or a further correction might be required after performance of a pre-integrated table lookup. Transfer functions may have a dependency on sample spacing, such that even a lookup table based implementation of a transfer function may require a separate table for each possible sample spacing in use.

Although the embodiment of FIG. 3 and FIG. 4 are described as using one contribution threshold, in other embodiments multiple contribution thresholds may be used. For example, in one embodiment, a first (lower) contribution threshold is set at 0.01 and a second (higher) contribution threshold is set at 0.02. For sampled points above the first contribution threshold, a first rendering calculation process is performed. For sampled points between the first contribution threshold and the second calculation threshold, a second rendering calculation process is performed. For sampled points below the second calculation threshold, a third rendering calculation process is performed. In some embodiments, different contribution thresholds may be set for different regions of the volumetric data set, for example for different segmented objects. In some embodiments, different contribution thresholds may be set with respect to different complex calculations. For example, a first contribution threshold may be used to determine whether complex lighting calculations are used, and a second contribution threshold may be used to determine whether object-to-object blending is used.

In some embodiments, different contribution thresholds may be used for different regions of the volumetric image data sets. For example, in some embodiments, the volumetric image data set may be segmented into a number of different segmented objects. Different contribution thresholds may be applied for different segmented objects. In some embodiments, a contribution threshold (for example, a threshold of 0.02) may be applied to some segmented objects, while no contribution threshold (or a contribution threshold of 0) may be applied to other segmented objects.

For example, in some embodiments, tumors may be considered so important that their presentation should never be simplified. Therefore, in such embodiments, sampled points identified as being part of a tumor may always have the more complex calculation process applied (a significance threshold of 0). For sampled points identified as being part of ordinary tissue the calculation process applied may be complex or simple depending on whether the sample contribution at the point is above the significance threshold (for example, 0.02).

Although the embodiment of FIG. 3 and FIG. 4 is performed on every sampled point on a ray, in other embodiments, only some of the sampled points on a ray may be used. For example, in some embodiments, no calculations are performed for regions of the three-dimensional space that have been identified as empty space or material of low interest, or having intensity or opacity values indicative of being empty space or material of low interest. For those sampled points that are used the rendering calculation process may be selected dependent on cumulative opacity as described. Thus, embodiments can include sample point filtering or thresholding features as well as opacity-dependent rendering calculation selection.

In some embodiments, sampled points are disregarded or not used if the cumulative opacity exceeds a threshold. For those sampled points that are used the rendering calculation process may be selected dependent on cumulative opacity as described. Thus, embodiments can include early ray termination features as well as opacity-dependent rendering calculation selection.

Furthermore, in some embodiments sample point spacings can be varied, for example in dependence on opacity or accumulated opacity values. For each of the sampled points that are used the rendering calculation process may be selected dependent on cumulative opacity as described. Thus, embodiments can include sample point spacing variation features as well as opacity-dependent rendering calculation selection.

Although embodiments above are described in relation to ray casting, in other embodiments the method of FIG. 3 and FIG. 4 may be applied to other rendering methods. Determining a sample contribution and selecting a rendering calculation process in dependence on the sample contribution may be performed in any rendering process in which lines of samples are considered, for example any rendering process involving ray paths or projection paths.

For example, in some embodiments the rendering process is shear-warp rendering. In shear-warp rendering the volumetric data set is transformed into a sheared space by translating and resampling each slice, the transformed data set is projected onto a viewing plane, and the image on the viewing plane is warped to obtain the final image. In shear-warp rendering samples may be considered along a line that passes through the transformed data set, and the sample contribution of each of those samples may be determined as described above with reference to FIG. 4. Complex or simplified calculations may be applied to each of the sample in dependence on the sample contribution.

Although embodiments have been described in which rendering calculation process selection (for example, selection or more or less complex rendering calculation processes at each sampling point) is performed based on accumulated values of the opacity parameter $\alpha$ and individual sample point values of $\alpha$, in alternative embodiments the selection may be performed based on accumulated and/or individual sample point values of any other parameter that is representative of or associated with opacity. For example, the selection may be based on values of a transmissivity parameter and/or a reflectivity parameter and/or an irradiance-related parameter, or any other parameter that represents an extent to which light (for example a virtual ray in a ray casting technique) is prevented from passing through the sample, regardless of the mechanism by which the light is prevented from passing.

Embodiments have been described in which a selection is made between first and second rendering calculation processes. In alternative embodiments, a selection may be made between any desired number of rendering calculation processes with, for example, at least one (or each) of the rendering calculation processes being at least one of less complex, less time consuming, requiring less processing power, or requiring less memory than at least one other (or each other) of the rendering calculation processes.

Embodiments have been described in which the same volumetric image data is used to determine both color and opacity values. In other embodiments more than one registered or otherwise aligned volumetric image data set may be used to determine color and opacity values. For example, some embodiments may be applied to fusion volume rendering processes. In such embodiments there may be several source volumes that are combined to for a virtual multi-channel volume. The different channels are then used to control the color and opacity of the samples taken as the renderer steps along the ray. One example of this is where volumetric perfusion information (from PET/SPECT) is used to color of the sample and the CT data is used to determine the opacity and the lighting of the sample. This allows color in the final image to show the functional and structural information in the final image, and embodiments can in some cases accelerate or make more efficient the fusion volume rendering process.

Particular units have been described herein. In some embodiments functionality of one or more of these units can be provided by a single processing resource or other component, or functionality provided by a single unit can be provided by two or more processing resources or other components in combination. Reference to a single unit encompasses multiple components providing the functionality of that unit, whether or not such components are remote from one another, and reference to multiple units encompasses a single component providing the functionality of those units.

Whilst certain embodiments have been described, these embodiments have been presented by way of example only, and are not intended to limit the scope of the invention. Indeed the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. An image rendering apparatus, comprising:
   processing circuitry configured to
      obtain volumetric image data representative of a three-dimensional region; and
      perform a rendering process on the volumetric image data that includes a sampling process that comprises, for each of a plurality of sampling paths, determining a respective color or grayscale value for a corresponding pixel based on a plurality of sampled points along the sampling path, wherein:
   for each sampling path, the sampling process comprises, for each of at least some of the sampled points on the sampling path,
      calculating a significance factor for the sampled point, wherein the significance factor for the sampled point is a sample contribution that is a function of both an opacity at the sampled point and of an accumulated opacity calculated from opacity at sampling points along the sampling path up to the sampling point, such that sampled points that make a higher contribution to the color or grayscale value have a higher significance factor than sampled points that make a lower contribution to the color or grayscale value;
      selecting, for the sampled point, one of a plurality of rendering calculation processes in dependence on the calculated significance factor, wherein the plurality of rendering calculation processes comprise a first rendering calculation process and a second rendering calculation process that each calculate a diffuse contribution differently; and
      performing the selected rendering calculation process to obtain at least one image data value for the sampled point, and
   for each sampling path, the sampling process comprises determining the color or grayscale value for the corresponding pixel by combining the determined image data values for each of the plurality of sampled points for the path.

2. The image rendering apparatus according to claim 1, wherein the plurality of rendering calculation processes comprise a first rendering calculation process and a second rendering calculation process, wherein the second rendering calculation process is at least one of less complex, less time consuming, requires less processing power, or requires less memory than the first rendering calculation process.

3. The image rendering apparatus according to claim 2, wherein, for at least some of the sampling paths, the processing circuitry is further configured to select the first rendering calculation process for at least some of the sampled points and to select the second rendering calculation process for at least some other of the sampled points.

4. The image rendering apparatus according to claim 2, wherein the second rendering calculation process at least one of omits a calculation that is included in the first rendering calculation process or includes a simplified version of the calculation that is included in the first rendering calculation process.

5. The image rendering apparatus according to claim 4, wherein the calculation of the first rendering calculating process that is omitted or simplified in the second rendering calculation process comprises at least one of:
   a pre-integration calculation;
   a lighting calculation;
   a shading calculation;
   a segmentation interpolation calculation;
   an object-to-object blending calculation;
   an irradiance calculation of a global illumination algorithm;
   a shadow ray calculation; and
   an ambient occlusion calculation.

6. The image rendering apparatus according to claim 4, wherein the calculation of the first rendering calculating process that is omitted or simplified in the second rendering calculation process comprises a lighting calculation that includes calculation of a normal to a sampled point and determining a light level based on a normal to the sampled point, and the second calculation process omits the calculation of the normal to the sampled point in determining the light level.

7. The image rendering apparatus according to claim 6, wherein, for the second calculation process, the lighting calculation comprises determining a light level for a sampled point based on at least one of an ambient light level, a proportion of diffuse light, and a proportion of specular light.

8. The image rendering apparatus according to claim 2, wherein the plurality of rendering calculation processes comprise
   selecting the second rendering calculation process for all of the sampled points that correspond to one of air or vacuum;
   selecting the first rendering calculation process for at least some of a sub-set of the sampled points corresponding to anatomy of the patient or other subject; and
   selecting the second rendering calculation process for all of a further sub-set of the sampled points corresponding to anatomy of the patient or other subject,
   wherein the further sub-set of sampled points are farther from the source of the sampling path than the first sub-set of sampled points.

9. The image rendering apparatus according to claim 1, wherein the processing circuitry is further configured, for each of at least some of the sampled points, to compare the significance factor for the sampled point to a threshold and to perform the selecting of one of the plurality of the rendering calculation processes in dependence on the outcome of the comparison.

10. The image rendering apparatus according to claim 1, wherein the determined image data values for the plurality of sampled points comprise color or grayscale values and, for each sampling path, the color or grayscale value for the corresponding pixel is determined based on the color or grayscale value for each sampled point of the sampling path, the opacity for each sampled point, and the accumulated opacity for each sampled point.

11. The image rendering apparatus according to claim 1, wherein the rendering process comprises a ray casting process, and the sampling paths comprise ray paths.

12. The image rendering apparatus according to claim 1, wherein the rendering process comprises a shear warp rendering process and the sampling paths pass through a sheared volume.

13. The image rendering apparatus according to claim 1, wherein for each sampling path the sampling process comprises, for each of the at least some of the sampled points, determining a respective opacity value for the sampled point and the respective accumulated opacity value for the sampled point.

14. The image rendering apparatus according to claim 13, wherein determining an opacity value for the sampled point comprises determining an intensity value for the sampled point and at least one of: determining the opacity value from the intensity value in accordance with a transfer function and determining the opacity value from the intensity value in accordance with a classifier.

15. The image rendering apparatus according to claim 13, wherein determining an accumulated opacity value for a sampled point comprises determining the accumulated opacity value for the sampled point from the opacities of a plurality of previous sampled points on the sampling path.

16. The rendering apparatus according to claim 1, wherein the volumetric image data comprises opacity values and at least one of color and grayscale values for positions in the three-dimensional region.

17. The image rendering apparatus according to claim 1, wherein the volumetric image data comprises intensity values,
   the processing circuitry is further configured to obtain converted volumetric image data by converting the intensity values to opacity values and at least one of color and grayscale values for positions in the three-dimensional region, and
   the determining of a respective opacity for a sampled point and a respective accumulated opacity for a sampled point comprises determining the respective opacity value and accumulated opacity value from the converted volumetric image data.

18. The image rendering apparatus according to claim 17, wherein the converting of the intensity values comprises at least one of converting the intensity values in accordance with a transfer function and converting the intensity values in accordance with a classifier.

19. The image rendering apparatus according to claim 17, wherein the processing circuitry is further configured to one of:
   convert the intensity values as part of the sampling process; and
   convert the intensity values in a pre-conversion process before the sampling process.

20. The image rendering apparatus according to claim 1, wherein one of:
   the volumetric image data comprises at least one of CT data, MRI data, and PET data; and
   the volumetric image data is obtained from at least one of the CT data, the MRI data, and the PET data.

21. The image rendering apparatus according to claim 1, wherein the significance factor is representative of a significance of the sampled point to the color or grayscale value for the corresponding pixel.

22. The image rendering apparatus of claim 1, further comprising a display to display a rendered image using the determined pixel color or grayscale values.

23. A method of rendering, comprising:
   obtaining volumetric image data representative of a three-dimensional region;

performing a rendering process on the volumetric image data that includes a sampling process that comprises, for each of a plurality of sampling paths, determining a respective color or grayscale value for a corresponding pixel based on a plurality of sampled points along the sampling path, wherein:

for each sampling path, the sampling process comprises, for each of at least some of the sampled points on the sampling path.

calculating a significance factor for the sampled point, wherein the significance factor for the sampled point is a sample contribution that is a function of both an opacity at the sampled point and of an accumulated opacity calculated from opacity at sampling points along the sampling path up to the sampling point, such that sampled points that make a higher contribution to the color or grayscale value have a higher significance factor than sampled points that make a lower contribution to the color or grayscale value;

selecting, for the sampled point, one of a plurality of rendering calculation processes in dependence on the calculated significance factor, wherein the plurality of rendering calculation processes comprise a first rendering calculation process and a second rendering calculation process that each calculate a diffuse contribution differently; and performing the selected rendering calculation process to obtain at least one image data value for the sampled point;

for each sampling path, the sampling process comprises determining the color or grayscale value for the corresponding pixel by combining the determined image data values for each of the plurality of sampled points for the path; and displaying a rendered image using the determined pixel color or grayscale values.

24. A computer program product comprising a non-transitory storage medium storing instructions that are executable to perform the method according to claim 23.

* * * * *